2,794,817
Patented June 4, 1957

2,794,817

GERMICIDALLY ACTIVE PHENOLIC COPPER CHELATE COMPOUNDS

Frederick C. Bersworth, East Orange, N. J., assignor to The Dow Chemical Company, Midland, Mich., a corporation of Delaware No Drawing. Application October 7, 1952, Serial No. 313,607

4 Claims. (Cl. 260—438)

This invention relates to metal chelate compounds and has for its object the provision of metal chelate compounds of mono phenol substituted alkylene polyamino acids which possess strong bactericidal and fungicidal properties.

Another object is to provide a germicidally active metal chelate compound for use in aqueous solutions having a variable pH range.

Still another object is to provide a germicidally active metal carrier compound for use in aqueous solutions having a variable pH range.

Other objects will be apparent as the invention is more fully hereinafter disclosed.

In accordance with these objects I have discovered that the polyvalent metal chelate compounds of normally toxic metals and mono-phenolic alkylene polyamino acids of the general formula:

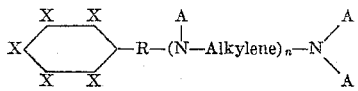

wherein X is one of the group consisting of hydrogen, hydroxyl, alkyl and halogen, with at least one X halogen and one X hydroxyl; A is a member of the group consisting of —CH$_2$COOM, —CH$_2$CH$_2$COOM, —CH$_2$PO$_3$M$_2$ and —CH$_2$CH$_2$PO$_3$M$_2$ where M represents hydrogen, ammonium, amine and alkali metal ions; alkylene is one of the group consisting of CH$_2$·CH$_2$, CH·CH$_3$·CH$_2$ and CH$_2$·CH$_2$·CH$_2$; R represents a divalent alkylene radical of from one to five carbon atoms (which may or may not have an ether oxygen); and $n$ is a positive integer selected from the group consisting of 1, 2, 3, 4 and 5; are germicidally active metal carriers in aqueous solutions, which are adapted to wide utility in the arts.

These metal chelate compounds conform to the following structure:

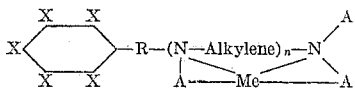

wherein X, R, A, $n$ and alkylene are as above defined and Me is a normally toxic metal selected from the group of normally toxic metals consisting of Cu, Pb, Cd and Ni.

Heretofore in the art, attempts have been made to combine the bactericidal effects of aromatic hydroxy compounds, such as phenol with the fungicidal effect of toxic metal ions, such as for instance copper, by forming the copper salts of phenolic compounds. This is quite effective but has great disadvantages in that the phenolic metal salt dissociates with the formation of metallic ions and phenolate ions which themselves are comparatively inactive as bactericides. The hydrolyzed metal ions are active as pro-oxidants and tend to form precipitates with many precipitating agents normally found in the systems in which such compositions are normally used.

I have found that the bifunctional metal chelate compounds comprising this invention do permit the dual effects of a phenol compound and a toxic metal ion to be used without the disadvantages of the simple salt or phenolate system at present employed. I have discovered that in the metal chelate compounds of the present invention I may solubilize the phenol constituent by neutralizing the acidic constituents of the compound leaving the hydroxyl group of the phenol constituent free to act as phenol. This neutralization may vary over a wide range of pH from the mono-salt to the completely neutralized compound. I have also discovered that the chelate compound is quite soluble and that the concentration of the toxic metal ion in solutions of the chelate compound is sufficient to give high activity toward micro-organisms but is insufficient to be toxic toward higher forms of life. The concentration is also of such low order as to be essentially non-oxidizing and non-precipitatable within the systems normally used. The chelate compound, therefore, is a unique composition of matter combining in one molecule the beneficial effect of phenols and substituted phenols and the beneficial effect of a toxic metal reservoir.

This chelate compound is therefore a unique and highly useful compound combining in one molecule the beneficial effects of recognized sanitation of the phenolic hydroxyl but also a toxic metal in form of a non-toxic reservoir. Even such highly toxic metal ions such as Pb and Cd, when substituted for Cu, are relatively inert in the biochemical sense. The reason for this being so, is that the metal-carrying unnatural amino acid of the bifunctional phenolic chelate compound is biologically stable, i. e., is not metabolized with resulting release of the metal ion held in complex combination. Furthermore, the concentration of metal ions of this chelate in solution is of such low order as to eliminate substantially all other undesirable effects of free ions such as oxidation and/or precipitation normally encountered in the field of utility of these compounds.

More generically the chelate compounds of the present invention conform to the generic structural formula:

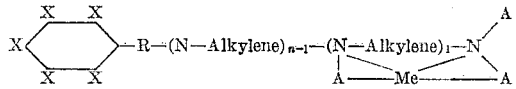

wherein R, X, A, $n$, alkylene and Me have the same identity as given above.

In addition to being bactericidal and fungicidal agents these metal chelate compounds of the present invention possess desirable properties, per se, as metal carriers in aqueous and in many non-aqueous systems in which the chelated metal ion functions as a solubilizing group for the chelate compound. These properties of the chelate compounds give a wide field of utility for the compounds of this invention in acid, neutral and alkaline pH solutions, and in many non-aqueous systems, as one skilled in the art will readily recognize.

I have found that in those chelate compounds of this invention in which the R group is not present, the phenol group seems to prevent the strong chelation of most metal ions particularly the alkaline earth metal ions. However, when R represents a methylene group containing from 1 to 5 carbon atoms the compounds of this invention have a strong affinity for transition, heavy, alkaline earth and rare earth metal ions forming extremely stable chelate compounds therewith. As the length of the R chain is increased within the range of 1 to 5 carbon atoms the stability of the chelate is somewhat decreased, but still remains high, indicating that the phenol and amino acid groups react chemically essentially independently of each other. Thus two independent functions may be obtained in the same molecule; the bactericidal effect of the substituted phenol groups and the fungicidal and solubilizing effect of the chelated metal ion in the amino acid group of the molecule.

In the chelate compounds of the present invention all of the A groups on the amino nitrogens function as salt-forming groups. When $n=1$, the compounds are derivatives of ethylene, propylene and trimethylene diamine depending on the value of the alkylene group therein. In such alkylene polyamino acid compounds only two of the A groups function as chelate-forming groups, one A group from each of the nitrogen atoms being involved in the chelating of the metal ion. This leaves the remaining A group to function, as a water solubilizing group for the chelate compound without the necessity of phenolate formation as is now necessary in the art.

In general, with increase in $n$ from 1 to 5 the chelate forming properties of the compound increase as well as do the solubilities of the compounds since a greater number of solubilizing groups are present. Those compounds in which A represents the —$CH_2COOM$ group form the most stable chelates. Maximum chelate stability is obtained in the compounds of this invention when alkylene represents the ethylene group and A represents the —$CH_2COOM$ group.

The general method of preparing the metal chelate compounds of this invention comprises reacting the selected mono-substituted phenol alkylene polyamino acid (prepared according to methods described in my previous applications bearing Serial Nos. 193,541 and 193,544, filed November 1, 1950, and conforming to the generic formula herein given) with the carbonate or hydroxide of the metal desired in Me position therein in a one to one molar ratio where the mono-substituted phenol alkylene polyamino acid conforms to the formula wherein $n=1$ or 2. When $n$ represents the positive integers 4 and 3, two moles of metal carbonate or hydroxide can be chelated per mole of polyamino acid; and when $n=5$, three moles of metal carbonate or hydroxide can be chelated per mole of polyamino acid.

Obviously, for those polyamino acids wherein $n=2$, 3, 4 and 5, other than a one to one molar ratio of polyamino acid to metallic carbonate or hydroxide can be used. The remaining unchelated acid groups function as solubilizing groups and as sequestering groups for contaminating metallic ions which may be present in the aqueous system in which the compound is formed or may be used subsequently.

As specific examples of the compounds within the broad scope of this invention but not as a limitation of the same, the following examples are given:

Example I

One mole of N-(2-hydroxy-3-isopropyl-5-chlorobenzyl)-ethylene diamine-N,N',N'-triacetic acid is suspended in 1500 ml. of distilled water at about 80° C. One mole of cupric carbonate is gradually added at such a rate that the evolution of carbon dioxide does not become too rapid. When formation of the chelate is complete, the pH is adjusted to 7.0 by means of caustic whereupon a clear solution results.

The monosodium sodium salt of this chelate compound is obtained as a blue crystalline solid by concentration of the solution followed by precipitation with methanol. The product conforms to the structural formula:

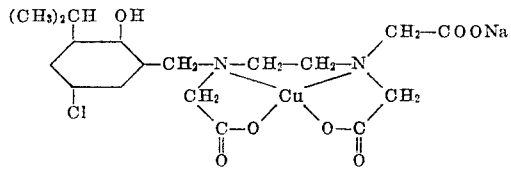

Example II

One-half mole of N-(3,5-dichloro-4-hydroxybenzyl)-ethylene diamine-N,N',N'-triacetic acid was reacted with one-half mole of nickel carbonate according to the procedure of Example I, to give a greenish-blue solution.

Isolation of the product by concentration and precipitation with methanol gave a blue crystalline solid conforming to the formula:

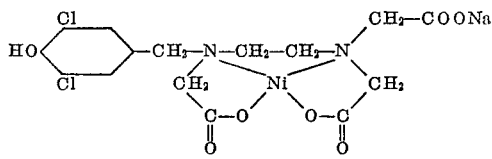

Example III

One-half mole of N-(3,5-dichloro-4-hydroxyphenyl)-n-butylethylene diamine triacetic acid and one-half mole of cadmium carbonate were reacted together and the product separated from solution as in Example I.

The white crystalline product obtained conforms to the structural formula:

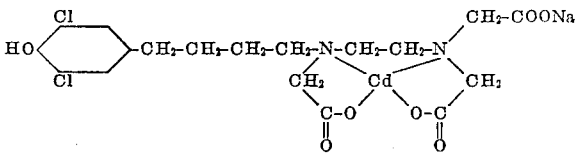

Example IV

One mole of N-(2-chloro-4-hydroxybenzyl)-ethylene diamine N,N',N'-trimethyl phosphonic acid was reacted with one mole of cadmium carbonate as in Example I. Adjustment of the pH to 7.0 with sodium hydroxide produced a clear solution. Evaporation of the solution gave a white crystalline solid conforming to the structure:

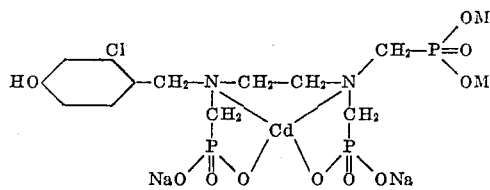

Example V

One-half mole of N-(3,5-dichloro-4-hydroxybenzyl)-diethylene triamine-N,N',N'',N'''-tetraacetic acid was reacted with one-half mole of cupric carbonate and the product isolated as in Example I.

The blue crystalline solid conforms to the structure:

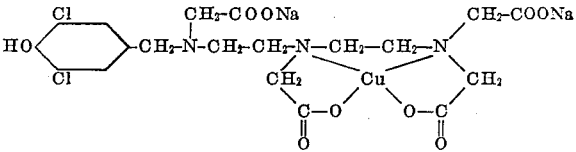

In the several examples given above, it is believed apparent to anyone skilled in the art that I may substitute the corresponding propylene- and trimethylene diamines for ethylene diamine without departure from the invention to form an analogous series of compounds and that, likewise, I may substitute any other phenol group for the phenol group of the specific examples without departure from the invention to form an analogous series of phenol substituted compounds with ethylene diamine or with any alkylene polyamine or polyalkylene polyamine substituted therefor within the scope of the genus disclosure. Further it is believed apparent that in substitution for the phenyl-phenol substituent group of the specific examples I may employ any other aromatic substitutent group such as substituted phenols and/or naphthols having at least one phenolic hydroxyl therein without departure from the invention, to produce substantially equivalent chelate compounds and such equivalent chelate compounds are to be considered to be within the scope of this invention. In view thereof, the examples given are believed adequate for one skilled in the art to practice the invention in the production of these analogous compounds.

The phenolic chelate compounds of this invention wherein $n=2, 3, 4$ and 5, show increased solubility in water as the number of alkylene groups increases with corresponding increase in the number of A groups. A greater capacity for chelating metallic ions is also observed in those compounds of this invention wherein $n=3, 4$ and 5.

The phenolic chelate compounds of this invention have, by virtue of their bifunctional character many diverse and interesting industrial applications. They may, by virtue of their metal content be used generally to introduce a desirable metal ion in low concentration into aqueous and non-aqueous systems. The phenolic chelate compounds, especially the copper chelate, are adapted to wide use as algaecides in swimming pools and ponds. The preformed phenolic chelate compounds also are adapted to use in lubricants to impart thereto germicidal properties and in the removal of slime in the paper industry. In all of these fields of utility, the chelate portion of the molecule imparts a solubilizing action to the compound and the substituted phenol ring imparts germicidal and bactericidal properties to the compound. In addition to its solubilizing action, the chelate portion of the molecule possesses, per se, useful properties as, for example, an algaecide, and a lubricant additive, and as an acid binder.

In the several fields of utility given above, the one to one chelate has been emphasized. It is believed apparent to any one skilled in the art that in those compounds wherein $n=3, 4$ and 5 the acid groups not involved in chelation serve also as solubilizing groups, by salt formation with strongly basic metal ions, such as an alkali metal, alkaline earth metal, ammonia and amines. More important, the compounds of this invention which possess acid groups not involved in chelate formation exert their germicidal and bactericidal activity over a wide pH range since the phenolic hydroxyl group remains unaffected by a change in pH.

I have also observed that, in any given chelate compound, as the value of R increases the bactericidal action of the compound increases presumably due to an increase in the surface activity which permits greater plasmolysis of the cell membrane.

This application is a continuation-in-part application of my copending application Serial No. 193,544, filed November 1, 1950, now Patent No. 2,624,758, issued January 6, 1953.

Having hereinabove described the present invention generically and specifically and having given several specific examples of the same by way of illustration but not by way of limitation, it is believed apparent that the same may be widely varied or modified without substantial departure from the invention and all such departures and modifications therefrom are contemplated as may fall within the scope of the following claims.

What I claim is:
1. The phenolic copper chelate compounds conforming to the following structural formula:

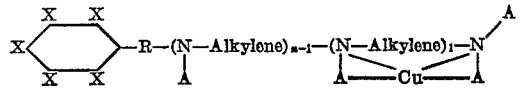

wherein X is one of the group consisting of hydrogen, hydroxyl, alkyl and halogen, with at least one X halogen and one X hydroxyl; A is a member of the group consisting of —CH$_2$COOM, —CH$_2$CH$_2$COOM, —CH$_2$PO$_3$M$_2$ and —CH$_2$CH$_2$PO$_3$M$_2$ and M represents hydrogen, alkali metal, amine and ammonium ions; alkylene is one of the group consisting of ethylene, propylene and trimethylene; R represents a divalent alkylene group having from one to about five carbon atoms; and $n$ is a positive integer selected from the group consisting of 1, 2, 3, 4 and 5.

2. The phenolic copper chelate compound of N-(2-hydroxy-3-isopropyl-5-chlorobenzyl)-ethylene diamine-N,N',N'-triacetic acid and its alkali metal ammonium and amine salts conforming to the formula:

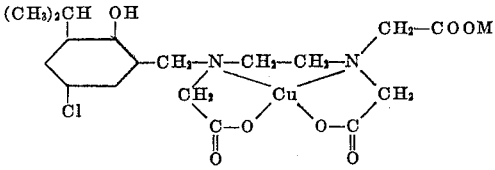

wherein M is one of the group consisting of hydrogen, alkali metal, ammonium and amine.

3. The phenolic copper chelate compound of N-(2-chloro-4-hydroxybenzyl)-ethylene diamine-N,N',N'-trimethyl phosphonic acid and its alkali metal ammonium and amine salts having the formula:

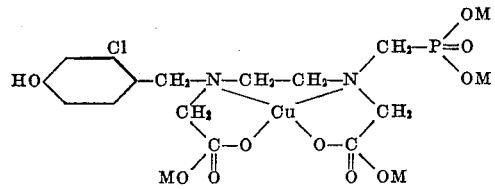

wherein M is one of the group consisting of hydrogen, alkali metal ammonium and amine.

4. The phenolic copper chelate compound of N-(3-5-dichloro-4-hydroxybenzyl)-diethylene triamine-N,N',-N",N"-tetraacetic acid and its alkali metal ammonium and amine salts corresponding to the formula:

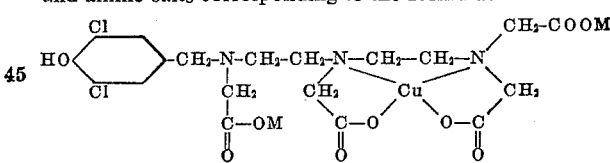

wherein M is one of the group consisting of hydrogen, alkali metal ammonium and amine.

References Cited in the file of this patent
UNITED STATES PATENTS

| | | |
|---|---|---|
| 2,489,363 | Bersworth | Nov. 29, 1949 |
| 2,624,756 | Bersworth | Jan. 6, 1953 |
| 2,624,758 | Bersworth | Jan. 6, 1953 |

OTHER REFERENCES

Schwarzenbach: Chimia, 3, 1 (1949).

Martell et al.: Chemistry of the Metal Chelate Compounds, pp. 471–472 (1952).

Martell et al.: Chemistry of the Metal Chelate Compounds, p. 538 (1952), Prentice Hall, Inc., New York, N. Y.